Sept. 5, 1933. W. E. SLOAN 1,925,412
FLUSH VALVE
Filed Nov. 21, 1930

Inventor
William E Sloan
By Parker & Carter Attys.

Patented Sept. 5, 1933

1,925,412

UNITED STATES PATENT OFFICE 1,925,412

FLUSH VALVE

William E. Sloan, Chicago, Ill.

Application November 21, 1930
Serial No. 497,106

6 Claims. (Cl. 137—93)

This invention relates to improvements in flush valves and has for its object to provide a new and improved device of this description. The invention has as a further object to provide a flush valve having a self-cleaning tilting valve as a part thereof.

The invention has as a further object to provide a flush valve having a tilting valve as a part thereof arranged so as to allow the seat of the tilting valve to be opened around its entire circumference so that there is no place left for sediment or débris to accumulate and prevent the valve from closing tight.

The invention has as a further object to provide a flush valve having a tilting valve as a part thereof which has a seat-engaging portion which engages the seat when the valve is closed, and which has a laterally extended portion having an engaging point at a distance from the seat-engaging portion and which acts as a pivotal point when the valve is tilted.

The invention has as a further object to provide a flush valve which has a self-cleaning bypass and a tilting valve for actuating the same, said tilting valve having a pivotal portion which extends beyond its seat-engaging portion and which acts as the pivotal point when the valve is tilted so as to give a greater movement of the actuating part which actuates the self-cleaning bypass construction.

The invention has further objects which are more particularly pointed out in the accompanying description.

Referring now to the drawing, Fig. 1 is a vertical sectional view through one form of flush valve embodying the invention;

Like numerals refer to like parts throughout the several figures.

Figure 1:
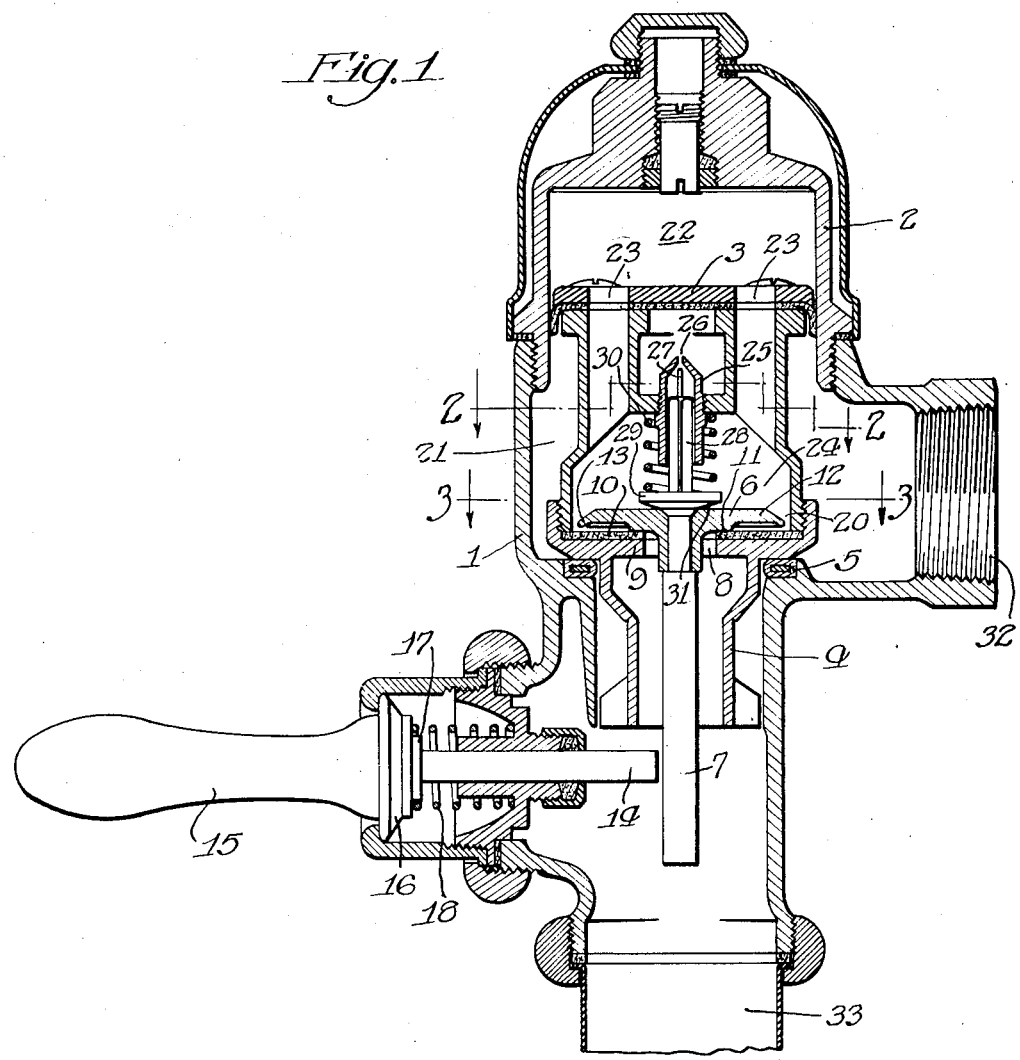

Referring now to the drawing, there is illustrated a flush valve having a casing made up of the sections 1 and 2. Within this casing is a main valve 3 which is shown as a reciprocating or piston valve. The valve 3 has connected thereto as a part thereof a section 4 which engages a seat 5 when the main valve is closed. Within the main valve is a tilting valve 6 which has a stem 7 which projects through a hole 8 in the wall 9 of the main valve. A seat 10 of non-metallic material is provided for the tilting valve and is supported upon the wall 9. The tilting valve has a seating portion 11 which surrounds the opening 8 and which engages the seat 10 when the tilting valve is closed. This tilting valve is provided with a laterally extended portion 12 which extends beyond the seating portion 11, preferably all the way around, and is at a higher level so that when the tilting valve is closed no part of this extended portion engages the seat.

When the tilting valve is tilted, the seating portion 11 is entirely lifted from the seat and the edge 13 of the extended portion of the tilting valve engages the seat, or some fixed part, and acts as a pivotal point about which the tilting valve moves.

The tilting valve may be tilted by any suitable mechanism. As herein shown, the valve is tilted by means of an actuating part 14 which engages the stem 7 of the valve. This actuating part is moved inwardly by means of a handle 15 which has a disc 16 which engages a disc 17 on the actuating part 14. When the handle 15 is moved in any direction the actuating part 14 is moved inwardly to engage the stem 7 and tilt the valve about its edge 13. The actuating part 14 is returned to its initial position when the handle is released by the retracting spring 18.

It will be seen that by means of this construction the seating portion 11 of the tilting valve is entirely freed all the way around from its seat each time the valve is opened so that any sediment or débris or foreign matter of any kind will be washed away throughout the entire circumference.

Figure 3:
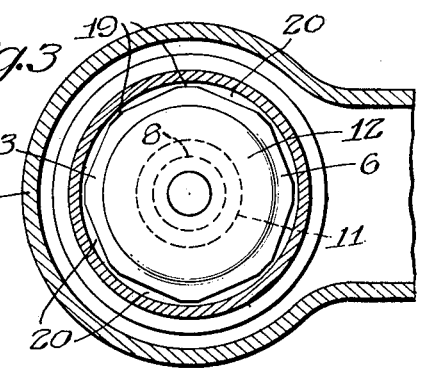
Fig. 3 is a sectional view taken on line 3—3 of Fig. 1.

The periphery of the tilting valve is arranged so as to provide centralizing surfaces to insure the proper centralizing of the valve and to provide water passages through which water is forced, all the way around, to insure the proper cleaning of the tilting valve seat. In the construction herein shown this result is provided by forming the portion of the main valve, in which the auxiliary valve is located, circular and providing a series of engaging faces 19 which engage the inner surface of the main valve to centralize the auxiliary valve and providing a plurality of water passages 20 between the centralizing points, as clearly shown in Fig. 3.

Figure 2:
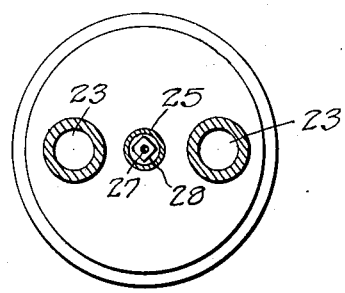
Fig. 2 is a sectional view taken on line 2—2 of Fig. 1.

It will be seen that when the tilting valve is tilted, water, which at this time fills the space within the main valve 3 and the chamber above it, rushes through these water passages 20 all the way around the tilting valve so as to insure the washing away of all débris or foreign matter. The main valve, by means of the piston at its upper end, divides the casing into two chambers 21 and 22. These chambers are connected by a self-cleaning bypass which is formed by the passageway in the piston connected with the chamber 24 containing the tilting valve, and this chamber 24 is connected with the chamber 21 by means of a hollow member 25 which projects into the chamber 21 and which is provided with a small opening 26. The upper end of the hollow member 25, it will be seen, is entirely surrounded by the water in the chamber 21, as clearly illustrated in Fig. 2.

A cleaning member 27 is provided, and this cleaning member is projected through the opening 26 each time the tilting valve is tilted and is withdrawn entirely therefrom each time the tilting valve is seated. This is accomplished by connecting the cleaning member 27 with an actuating member 28 which reciprocates in the hollow member 25 and which is provided with a disc 29 which engages the tilting valve.

It will be seen that when the tilting valve is tilted, the actuating member 28 is pushed upwardly and the cleaning member 27 is projected through the opening 26 so as to force out any foreign matter that may be lodged therein. When the tilting valve is moved back to its seat, the cleaning member 27 is entirely withdrawn from the hole 26 by means of the retracting spring 30. It will be seen that since the tilting valve has the projecting portion 12 extending a considerable distance beyond the seating portion 11 and which acts as a pivotal point when the valve is tilted, there will be a much greater movement of the cleaning member 27 than is usually the case with the ordinary tilting valve. This is important, as it gives the cleaning member a more effective movement and insures the proper cleaning of the opening 26 of the bypass.

The face of the disc 29 which engages the tilting valve is preferably made beveled as shown at 31. This reduces the strain and friction on the actuating member 28 when the tilting valve is tilted and gives a better action of the parts. In this construction there is a passageway extending through the main valve through which water is discharged from the upper chamber 22, this passageway being controlled by the tilting valve 6. The casing is provided with an inlet 32 connected to a suitable source of water supply, and an outlet 33 which connects with the device in connection with which the valve is used. The use and operation of my invention are as follows:

When the parts are in the position illustrated in Figure 1, the valve is closed. When it is desired to operate the valve, the handle 15 is moved. This moves the actuating part 14 which engages the stem 7 of the tilting valve and tilts said valve about the edge 13 as a pivotal point. The tilting of the valve lifts the seating face 11 thereof from the seat 10 throughout the entire circumference thereof. Water from the chamber 22 then flows through the passages 23 and through the water passages 20 around the tilting valve and through the opening 8, washing all foreign matter or débris away so that none of it will lodge on the seat so as to interfere with the seating of the tilting valve.

The tilting of the tilting valve moves the cleaning member 27 up through the bypass opening 26 so as to move any foreign matter that may be lodged therein. When the water passes from the chamber 22, the pressure in chamber 21 lifts the main valve 3 so as to open it and permit water to discharge through the outlet 33. When the handle 15 is released, the actuating part 14 is returned to its initial position and the tilting valve moves to its seat, thus closing the opening 8. The cleaning member 27 is at the same time entirely withdrawn from the opening 26. Water then enters the opening 26 and passes through the member 25 into the chamber 24 and through the passageways 23 to the chamber 22, thus equalizing the pressure between the chambers 22 and 21 and insuring the proper closing of the main valve.

I claim:

1. A flush valve comprising a casing, a main valve therein provided with a passageway extending therethrough, said passageway having an enlargement, and a contracted portion below said enlargement, a valve seat surrounding said contracted portion, a tilting valve in the enlargement of said passageway for controlling the passageway, said tilting valve provided with a stem which projects through said contracted portion, a seating face on said tilting valve which engages the seat extending around the contracted portion of said passageway, said tilting valve having a laterally projecting portion extending beyond the seating face thereof and normally out of contact with the surface to which it is opposed, the outer edge of said projecting portion engaging the surface with which it is opposed when the valve is tilted so as to provide a pivotal point at a distance from said seating face, about which the valve moves when tilted.

2. A flush valve comprising a casing, a main valve therein provided with a passageway extending therethrough, said passageway having an enlargement, and a contracted portion below said enlargement, a valve seat surrounding said contracted portion, a tilting valve in the enlargement of said passageway for controlling the passageway, said tilting valve provided with a stem which projects through said contracted portion, a seating face on said tilting valve which engages the seat extending around the contracted portion of said passageway, said tilting valve having a laterally projecting portion extending beyond the seating face thereof and normally out of contact with the surface to which it is opposed, the outer edge of said projecting portion engaging the surface with which it is opposed when the valve is tilted so as to provide a pivotal point at a distance from said seating face, about which the valve moves when tilted, and a plurality of engaging faces on said tilting valve which engage the main valve to centralize the tilting valve, there being provided a series of water passages between said engaging faces.

3. A flush valve comprising a casing, a main valve therein, provided with a passageway extending therethrough, said passageway having an enlargement, and a contracted portion below said enlargement, a valve seat surrounding said contracted portion, a tilting valve in the enlargement of said passageway for controlling the passageway, said tilting valve provided with a stem which projects through said contracted portion, a seating face on said tilting valve which engages the seat extending around the contracted portion of said passageway, said tilting valve having a laterally projecting portion extending beyond the seating face thereof and normally out of contact with the surface to which it is opposed, the outer edge of said projecting portion engaging the surface with which it is opposed when the valve is tilted so as to provide a pivotal point at a distance from said seating face, about which the valve moves when tilted, a bypass extending through said main valve, a cleaning device for said bypass and actuating means therefor operated by said tilting valve.

4. A flush valve comprising a casing, a main valve therein provided with a passageway extending therethrough, said passageway having an enlargement, and a contracted portion below said enlargement, a valve seat surrounding said contracted portion, a tilting valve in the enlargement of said passageway for controlling the passageway, said tilting valve provided with a stem which projects through said contracted portion, a seating face on said tilting valve which engages the seat extending around the contracted portion of said passageway, said tilting valve having a laterally projecting portion extending beyond the seating face thereof and normally out of contact with the surface to which it is opposed, the outer edge of said projecting portion engaging the surface with which it is opposed when the valve is tilted so as to provide a pivotal point at a distance from said seating face, about which the valve moves when tilted, said main valve dividing the casing into an upper and lower chamber, a bypass connecting said chambers having the hollow member, one end of which projects into the upper chamber, the other end of which projects into the enlargement in said passageway, said hollow member having a contracted opening at the end which projects into said upper chamber, a cleaning device for said contracted opening, an operating mechanism for moving said cleaning device into and entirely withdrawing it from said contracted opening, said operating mechanism actuated by said tilting valve.

5. A flush valve comprising a casing, a main valve therein provided with a passageway extending therethrough, said passageway having an enlargement, and a contracted portion below said enlargement, a valve seat surrounding said contracted portion, a tilting valve in the enlargement of said passageway for controlling the passageway, said tilting valve provided with a stem which projects through said contracted portion, a seating face on said tilting valve which engages the seat extending around the contracted portion of said passageway, said tilting valve having a laterally projecting portion extending beyond the seating face thereof and normally out of contact with the surface to which it is opposed, the outer edge of said projecting portion engaging the surface with which it is opposed when the valve is tilted so as to provide a pivotal point at a distance from said seating face, about which the valve moves when tilted, said main valve dividing the casing into an upper and lower chamber, a bypass connecting said chambers having the hollow member, one end of which projects into the upper chamber, the other end of which projects into the enlargement in said passageway, said hollow member having a contracted opening at the end which projects into said upper chamber, a cleaning device for said contracted opening, an actuating part connected with said cleaning device, a disc to which said actuating part is connected, said disc being normally supported by said auxiliary valve, it being provided with a beveled face opposed to said auxiliary valve.

6. A flush valve comprising a casing, a main valve therein, a passageway through the main valve, a tilting valve in said main valve for controlling said passageway, a seat conected with the main valve, a seating face on the auxiliary valve for engaging said seat, a laterally projecting part on the tilting valve which projects laterally beyond said seat and which acts as a pivotal point about which the valve is tilted, whereby the seating face of the tilting valve is removed from its seat throughout the entire circumference when the tilting valve is tilted so as to permit the flowing water to flush the entire seat of the tilting valve to prevent foreign matter from lodging thereon, a bypass through said main valve, means for cleaning said bypass actuated by said tilting valve.

WILLIAM E. SLOAN.